(12) United States Patent
Kawai et al.

(10) Patent No.: US 7,621,031 B2
(45) Date of Patent: Nov. 24, 2009

(54) PALLET EXCHANGING DEVICE

(75) Inventors: Sumio Kawai, Niwa-Gun (JP); Atsuya Murata, Niwa-Gun (JP); Michio Yamao, Niwa-Gun (JP)

(73) Assignee: Okuma Corporation, Niwa-gun (JP)

( * ) Notice: Subject to any disclaimer, the term of this patent is extended or adjusted under 35 U.S.C. 154(b) by 69 days.

(21) Appl. No.: 11/750,403

(22) Filed: May 18, 2007

(65) Prior Publication Data

US 2007/0289115 A1    Dec. 20, 2007

(30) Foreign Application Priority Data

May 30, 2006    (JP)    ............................. 2006-150498

(51) Int. Cl.
*B23P 23/00*    (2006.01)
(52) U.S. Cl. .................................... 29/33 P; 198/346.1
(58) Field of Classification Search ................. 29/33 P, 29/563; 198/346.1, 345.3; 483/14, 15
See application file for complete search history.

(56) References Cited

U.S. PATENT DOCUMENTS

| | | | | |
|---|---|---|---|---|
| 4,679,286 A | * | 7/1987 | Momoi et al. ............... | 29/33 P |
| 4,797,989 A | * | 1/1989 | Cherko ......................... | 483/14 |
| 5,172,464 A | * | 12/1992 | Kitamura et al. .............. | 29/563 |
| 5,222,285 A | * | 6/1993 | Horikawa ..................... | 29/33 P |
| 2003/0172510 A1 | * | 9/2003 | Geiger et al. ................. | 29/33 P |

FOREIGN PATENT DOCUMENTS

| | | |
|---|---|---|
| JP | 06-063252 U1 | 9/1994 |
| JP | 2005-132876 A1 | 5/2005 |
| JP | 2005-238358 A * | 9/2005 |
| JP | 2007-152506 A * | 6/2007 |

OTHER PUBLICATIONS

Machine Translation of JP-2005-238358-A.*

* cited by examiner

*Primary Examiner*—Erica E Cadugan
(74) *Attorney, Agent, or Firm*—Burr & Brown (57) ABSTRACT

A pallet exchanging device is provided which can secure a sufficient working space and can cope with a multi-phase pallet exchanging system without increasing the size of the device. In a pallet exchanging device, a pallet stocker is constituted so that any pallet placing pedestal can be brought to a delivery position where a pallet is delivered and received to/from an arm, and the arm can be moved between a first position where pallets are exchanged in the working machine main body and a second position where a pallet is delivered and received at the delivery position of the pallet stocker. When the arm is moved to the second position, a space for a worker is provided on a front side of a work carry-in port.

2 Claims, 11 Drawing Sheets

PALLET EXCHANGING DEVICE

BACKGROUND OF THE INVENTION

This application claims the benefit of Japanese Patent Application Number 2006-150498 filed on May 30, 2006, the entirety of which is incorporated by reference.

1. Field of the Invention

The present invention relates to a pallet exchanging device which is installed in front of a working machine such as a vertical machining center and exchanges pallets on which works are placed.

2. Description of the Related Art

Conventionally, working machines such as a vertical machining center are provided with a pallet exchanging device, which exchanges a pallet which is provided in a standby position and on which a work before machining is placed (hereinafter, pre-machining pallet) and a pallet which is provided in an exchanging position (or machining position) and on which a machined work is placed (hereinafter, post-machining pallet), in proximity positions.

Such a pallet exchanging device includes a device disclosed in Japanese Patent Application No. 2005-132876 proposed by the same applicant of the invention in which an arm having a pair of forks facing opposite directions is provided so as to be revolvable and slidable to a front-rear direction with respect to a working machine main body. The pallet exchanging device is installed on a front side of the working machine main body provided with a spindle device or the like of the working machine. After the post-machining pallet in the exchanging position of the working machine main body is received by means of a sliding operation to the front-rear direction, the positions of the pre-machining pallet in the standby position and the post-machining pallet are reversed by the revolving operation, and the pre-machining pallet is placed in the exchanging position again by the sliding operation. When a worker accesses to the working machine main body for machining observation, cutting tool checking, measurement of machined products in machining of first product, the paired forks are revolved to face a right-left direction with respect to the working machine main body so that the operator is not disturbed by the pallet exchanging device. As a result, a working space can be secured on the front side of the working machine main body (namely, on the front side of a machining space).

Figure 11:
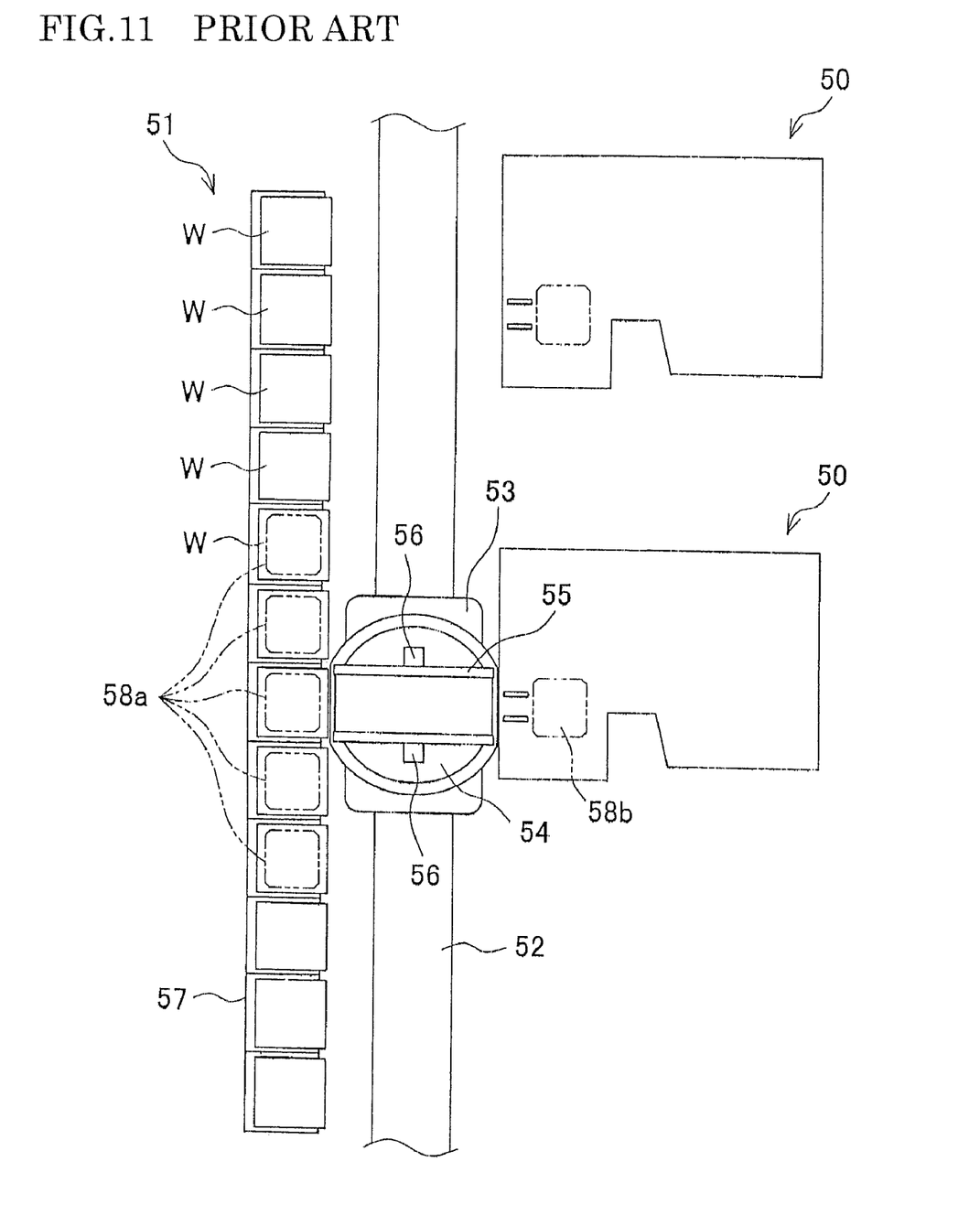
FIG. 11 is an explanatory diagram illustrating a conventional pallet exchanging device viewed from above.

On the other hand, pallet exchanging devices other than the above-described pallet exchanging device include a device disclosed in Japanese Utility Model Laid-Open No. 6-63252, for example. The pallet exchanging device 51 described in the Japanese Utility Model Laid-Open No. 6-63252 is explained with reference to FIG. 11. FIG. 11 is an explanatory diagram illustrating the pallet exchanging device 51 viewed from above. An up-down direction in FIG. 21 will be described as a right-left direction of the pallet exchanging device 51, a right-left direction in FIG. 11 will be described as a front-rear direction of the pallet exchanging device 51 in the description.

The pallet exchanging device 51 is provided to a front side of a plurality of working machines 50, 50 which are arranged in parallel in the right-left direction, and exchanges a pre-machining pallet 58a stored in a work storage rack 57 and a post-machining pallet 58b in the exchanging position (working position) of the working machine. The pallet exchanging device 51 has a rail 52 which are protruded to the right-left direction on the front side of the working machines 50, 50, and a movable platen 53 which slides along the rail 52. The movable platen 53 is provided with a revolving table 54 which horizontally revolves around a vertical axis, and the revolving table 54 is provided with an arm 55 having a pair of forks extensible to opposite directions. The arm 55 is movable to a vertical direction by means of lifting and lowering devices 56, 56. The work storage rack 57 has a plurality of pallet placing shelves in the vertical direction, and a plurality of works W, W . . . can be stored in one tier so as to be adjacent each other.

In such a pallet exchanging device 51, exchange between the pre-machining pallet 58a on which the work W before machining is placed and the post-machining pallet 58b on which the machined work is placed is performed, by means of the sliding operation of the movable platen 53 to the right-left direction, the lifting/lowering operation of the arm 55 to the vertical direction, and the revolving operation of the revolving table 54.

As described above, when the pallet exchanging device is provided to the front side of the working machine main body, it is a problem of securing a working space for a worker in front of the working machine main body. According to the pallet exchanging device which was proposed by the same applicant of the invention, the working space is tried to be secured by revolving the arm. However, since the length of the arm is limited in view of strength, the working space which is secured by revolving the arm is also limited. In the pallet exchanging device which was proposed by the same applicant of the invention, therefore, the sufficient working space for the worker cannot be secured according to working contents or the like. Since the arm can slide only to the front-rear direction with respect to the working machine, the pallet exchanging device cannot cope with a multi-phase pallet exchanging system described in the Japanese Utility Model Laid-Open No. 6-63252.

On the other hand, in the pallet exchanging device 51 described in the Japanese Utility Model Laid-Open No. 6-63252, although the sufficient working space can be secured on the front side of the working machine main body, since the works W, W . . . are stored to be arranged in the right-left direction in the work storage rack 57, the rail 52 for sliding the movable platen 53 should be projected to the right-left direction, thereby arising a problem such that the device becomes large. According to the growing in size of the pallet exchanging device 51, when the pre-machining pallet 58a at the end of the work storage rack 57 is exchanged, it takes a long time for the exchanging operation, thereby deteriorating machining efficiency of the work W.

The present invention is devised in view of the above problems, and its object is to provide a pallet exchanging device which can secure a sufficient working space and can cope with a multi-phase pallet exchanging system without increasing the size of the device.

SUMMARY OF THE INVENTION

In order to achieve the above object, the invention of a first aspect is a pallet exchanging device including:

a pallet supporting unit for supporting a pallet where a work is placed; and a pallet storage device having a plurality of pallet holders for holding pallets, wherein the pallet supporting unit exchanges pallets in a machine tool main body via a work carry-in port through which a work is carried into a machining space of the working machine main body, wherein in the pallet storage device, any pallet holder can be brought to a delivery position where a pallet is delivered and received to/from the pallet supporting unit, and wherein the pallet supporting unit is provided so as to be movable between a first position where the pallets are exchanged in the working machine main body and a second position where the pallet is delivered and received at the delivery position of the pallet storage device, and when the pallet supporting unit is moved to the second position, a space is provided on a front side of the work carry-in port.

The invention of a second aspect is the pallet exchanging device depending from the first aspect wherein the pallet storage device is constituted so that the pallet holders are protruded from a main body to a radial direction and the main body is revolved around a vertical axis so that any pallet holder is brought to the delivery position.

According to the present invention, the pallet supporting unit is movable between the first position where the pallets are exchanged in the working machine main body and a second position where the pallet is delivered and received at the delivery position of the pallet storage device, and the space can be provided on the front side of the work carry-in port by the movement to the second position. Accordingly, when a worker desires to perform a maintenance operation via the work carry-in port of the working machine main body, the working space can be secured on the front side of the work carry-in port by the movement of the pallet supporting unit to the second position. Therefore, when the invention is compared with the device which is proposed by the same applicant of the invention, the working space sufficient for the worker can be certainly secured on the front side of the work carry-in port, which is convenient.

Further, according to the present invention, the pallet exchanging device includes the pallet storage device having a plurality of pallet holders for holding pallets. In the pallet storage device, any pallet holder can be brought to a delivery position for delivering and receiving a pallet to/from the pallet supporting unit. Therefore, the operation for preparing the pallet on which the work to be machined next is placed can be efficiently performed during the machining in the working machine main body, and the machining efficiency can be improved. Further, when the present invention is compared with the conventional device which does not perform the operation for bringing to the pallet delivery position, the moving distance of the pallet supporting unit can be shortened, thereby downsizing the device itself and shortening the time required for the exchange.

Further, according to the invention of the second aspect, the pallet storage device is constituted so that the pallet holders are protruded from the main body to the radial direction and any pallet holder is brought to the delivery position by the revolving of the main body around the vertical axis. Therefore, when the pallet storage device is compared with conventional devices which store pallets in one row, the pallet storage device can be further downsized, namely, the pallet exchanging device can be further downsized.

DETAILED DESCRIPTION OF THE PREFERRED EMBODIMENT

A pallet exchanging device according to one embodiment of the present invention is explained below with reference to drawings.

Figure 1:
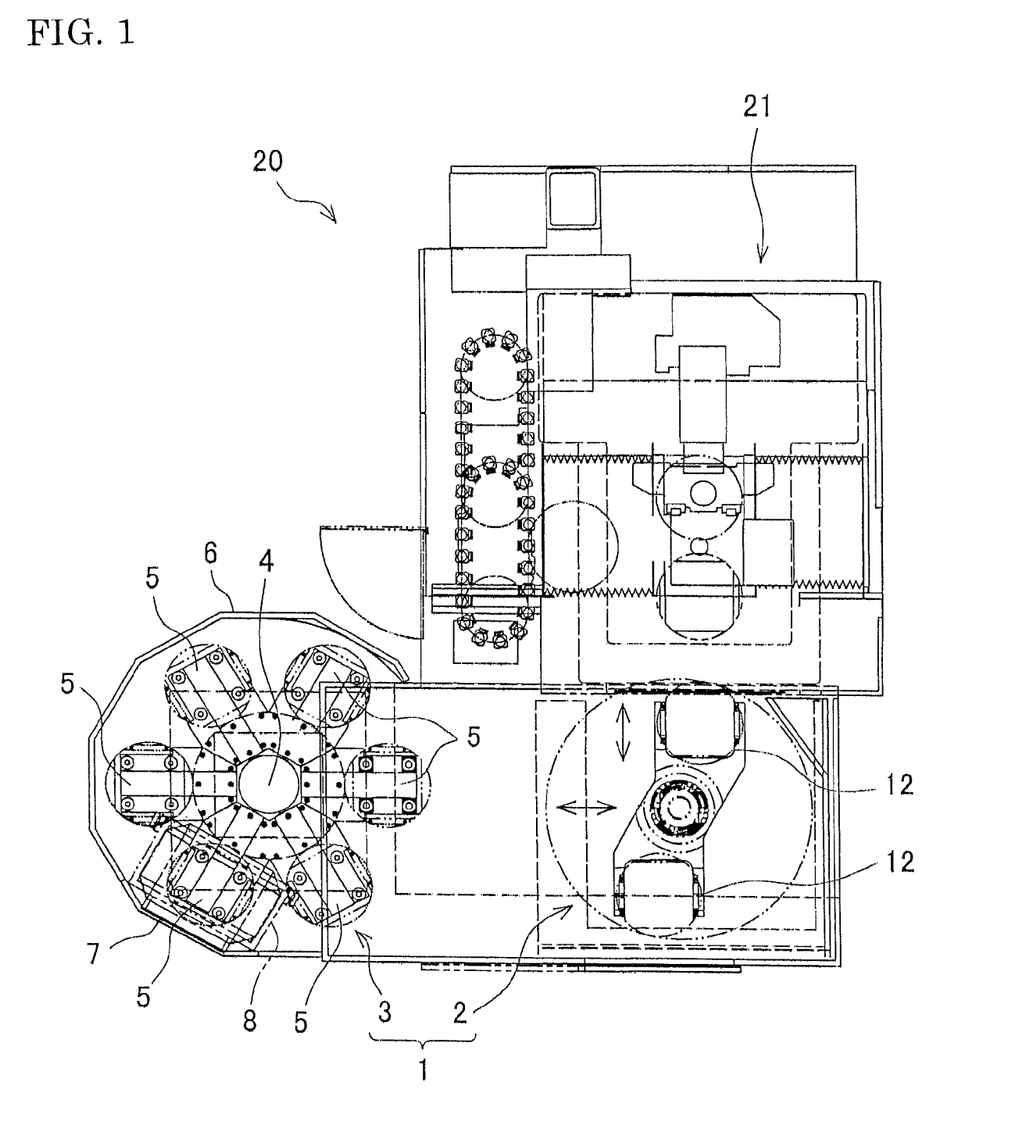
FIG. 1 is an explanatory diagram illustrating a working machine according to an embodiment viewed from above.
Figure 2:
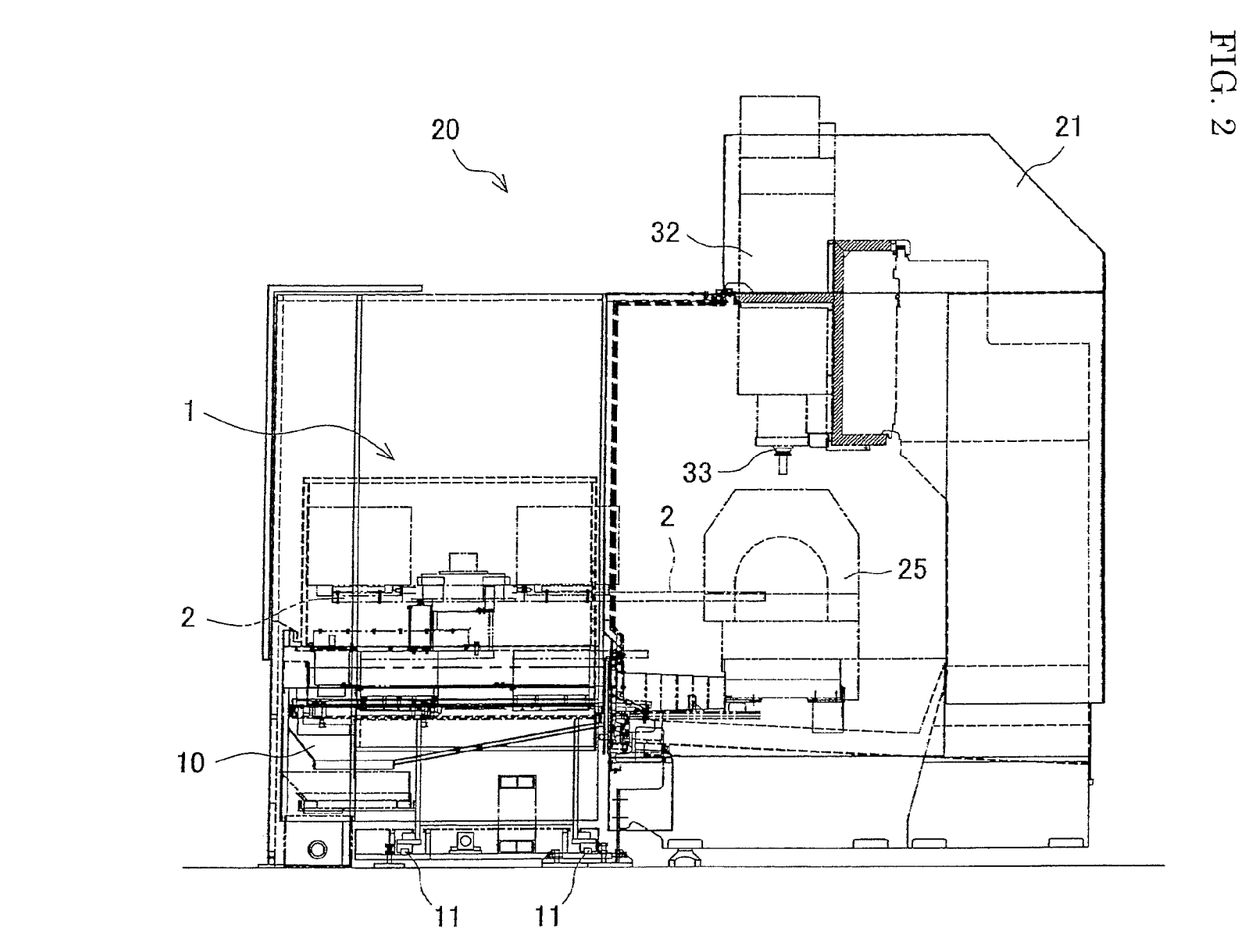
FIG. 2 is an explanatory diagram illustrating the working machine according to the embodiment viewed from the side.
Figure 3:
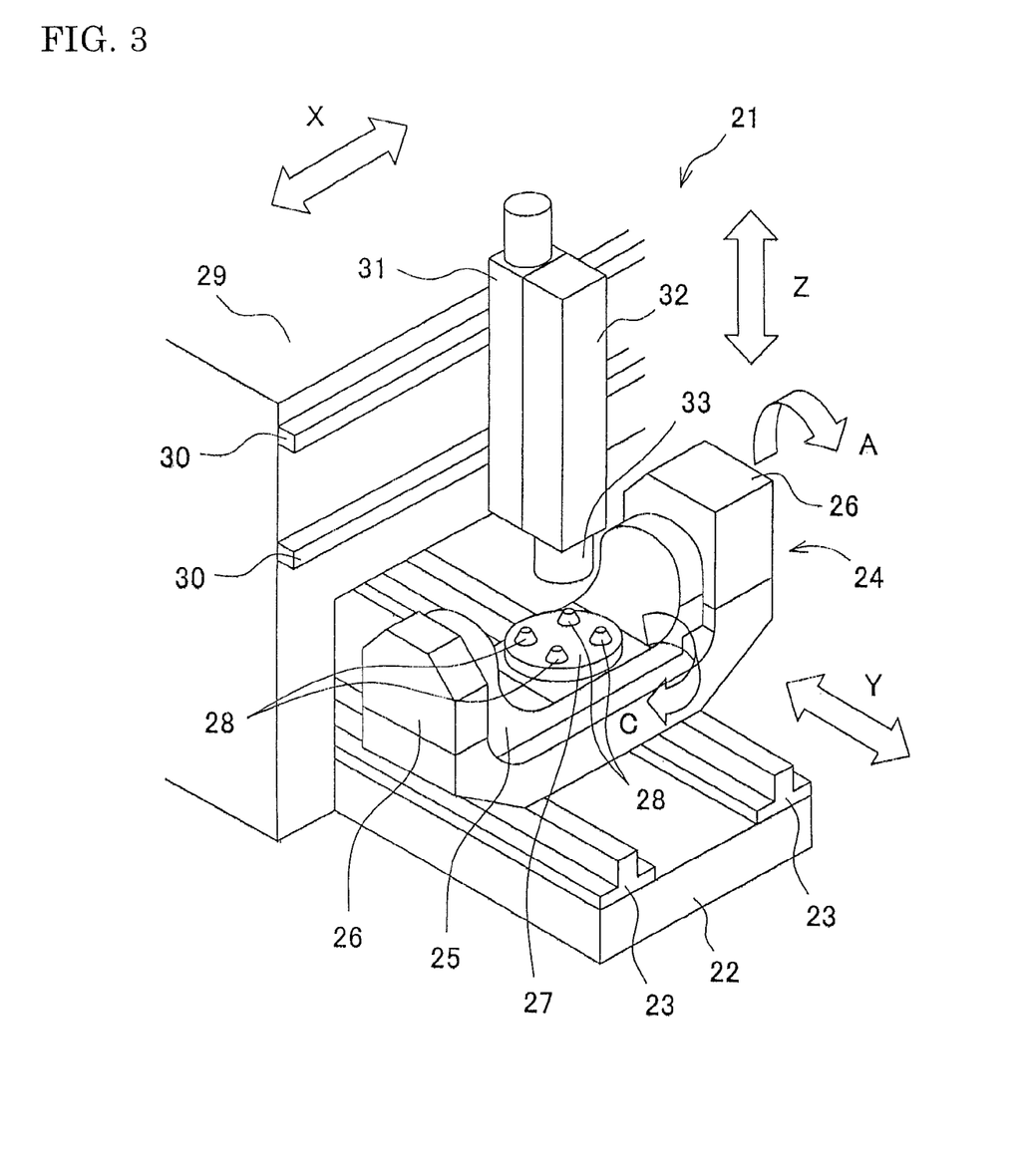
FIG. 3 is a perspective explanatory diagram illustrating a main body of the working machine according to the embodiment.

FIG. 1 is an explanatory diagram illustrating a working machine 20 having the pallet exchanging device 1 according to this embodiment viewed from above. FIG. 2 is an explanatory diagram illustrating the working machine 20 viewed from the side. FIG. 3 is a perspective explanatory diagram illustrating a main body 21 of the working machine 20. An up-down direction in FIG. 1 will be described as a front-rear direction of the working machine 20 in the description.

The working machine 20 is constituted so as to include the working machine main body 21 as a 5-axis control vertical machining center and the pallet exchanging device 1. The pallet exchanging device 1 is installed on the front side of the working machine main body 21 and has an arm (pallet supporting unit) 2 and a pallet stocker (pallet storage device) 3 as mentioned later.

The working machine main body 21 is explained with reference to FIG. 3. The working machine main body 21 is the 5-axis control vertical machining center, and Y axis guide rails 23, 23 are provided onto a front upper surface of a bed 22 to be a platform. An AC axis unit 24 having a trunnion structure is installed on the Y axis guide rails 23, 23 so as to be movable to a Y axis direction (to the front-rear direction of the working machine 20). The AC axis unit 24 has a trunnion 25 formed into a wide U shape, and contains A axis driving mechanisms 26 on right and left sides of the trunnion 25, respectively. The A axis driving mechanisms 26, 26 can rotate and tilt the trunnion 25 around an A axis parallel with an X axis direction (the right-left direction of the working machine 20). A table 27 for mounting a pallet on which a work to be machined is placed is installed onto the trunnion 25. The table 27 can rotate 360° around a C axis parallel with a Z axis (the vertical direction of the working machine 20) by a C axis driving mechanism (not shown) included in the trunnion 25. The reference number 28 designates a taper cone for locating and fixing a pallet onto the table 27, and the pallet to be placed on the table 27 is precisely located by the taper cones 28, 28 so as to be firmly fixed to the table 27 by a clamp device, not shown.

The bed 22 is provided with a cross rail 29 having a double-column structure which crosses the Y axis guide rails 23, 23. X axis guide rails 30 are provided onto the front surface of the cross rail 29, and a ram saddle 31 is installed onto the X axis guide rails 30, 30 so as to be movable to the X axis direction (the right-left direction of the working machine 20). A spindle head 32 having a spindle 33 at its lower end is installed on the front surface of the ram saddle 31 so as to be movable to the Z axis direction.

Further, the table 27 and the spindle 33 are provided into a machining space whose periphery is covered with a cover or the like. A work carry-in port 35 (shown in FIG. 4A) through which the work is carried into the machining space is opened on the cover which covers the front of the machining space, and a door 34 (shown in FIG. 4A) for opening and closing the work carry-in port 35 is mounted to the work carry-in port 35. The sliding operation and the rotating operation of the AC axis unit 24, the table 27 and the spindle head 32, and the opening/closing operation of the door 34 are controlled by an NC device, not shown.

In the working machine main body 21 having such a structure, the work fixed onto the table 27 (placed on the pallet) is located to a desired machining position by the revolving operation of the trunnion 25 around the A axis and C axis and the sliding operation of the AC axis unit 24 to the Y axis direction. While the spindle 33 to which a tool is mounted is being moved to the X axis and Z axis directions, the work is machined, so that the work can be machined from many directions. A worker such as an operator observes the working on the front side of the working machine 20, and accesses to the front side of the working machine 20 so as to perform operations for checking the tools and measuring the work after the machining (hereinafter, they are collectively called a maintenance operation) via the work carry-in port 35.

The pallet exchanging device 1 which is installed on the front side of the working machine main body 21 is explained below.

The pallet exchanging device 1 has an arm 2 having a pair of forks 12, 12 capable of supporting pallets, and a pallet stocker 3 which can store a plurality of pallets. In a first position, a pre-machining pallet 15a (shown in FIGS. 4A, 4B) at a standby position for mounting a work before machining, and a post-machining pallet 15b (shown in FIGS. 4A, 4B) at an exchanging position (on the table 27) for mounting a machined work are exchanged in the working machine main body 21. In a second position, the post-machining pallet 15b for mounting the machined work received from the working machine main body 21 is delivered to the pallet stocker 3, and a pallet 15c (shown in FIGS. 8D-F), which is stored in the pallet stocker 3, for mounting a work before machining is delivered to the arm 2. The pallet exchange between the arm 2 and the working machine main body 21 and the pallet delivering operation between the arm 2 and the pallet stocker 3 are described in detail later.

The arm 2 is provided so as to revolve around the Z axis on a base platen 10 by a servo motor or the like, not shown, and so that the paired forks 12, 12 which support the pallet face the opposite directions and are symmetrical with respect to the revolving axis which is shifted to a direction perpendicular to the direction of the forks 12 only by a predetermined distance. The arm 2 can move to the Y axis direction along a guide (not shown) provided to the base platen 10.

Further, the arm 2 can move up and down along the Z axis direction by a hydraulic cylinder, not shown, and can slide to the right-left direction together with the base platen 10 along guide rails 11, 11 provided along the X axis direction. The forks 12 are installed in parallel so that a pair of supporting claws are separated from each other by a predetermined gap (the gap is approximately the same as the right-left width of the pallet), and the supporting claws are inserted below receiving portions provided to the right and left sides of the pallets, respectively so as to be capable of supporting the pallet.

On the other hand, the pallet stocker 3 is constituted so that six pallet placing pedestals (pallet holders) 5, 5 . . . are protruded from the main body 4 to a radial direction, and the main body 4 can be revolved around an axis parallel with the Z axis direction by a driving mechanism or the like, not shown. Any pallet placing pedestal 5 can be pivoted to be brought to a predetermined delivery position. Further, a setup station (to be a setup position) 8 for setting up a work on a pallet with respect to an external device is provided to a predetermined revolving position different from the delivery position of the pallet stocker 3. The surrounding of the pallet stocker 3 is covered with a cover 6, and an opening is provided to a position of the cover 6 corresponding to the setup station 8, and a door 7 for opening/closing the opening is provided.

In the pallet exchanging device 1, the revolving operation and the sliding operation of the arm 2, and the revolving operation of the pallet stocker 3 are controlled by the NC device provided to the working machine 20.

The pallet exchange of the pallet exchanging device 1 with respect to the working machine main body 21, namely, the operation for exchanging the pre-machining pallet 15a and the post-machining pallet 15b by means of the arm 2 is described with reference to FIGS. 4A-6G. FIGS. 4A-6G are explanatory diagrams illustrating forms that the pre-machining pallet 15a and the post-machining pallet 15b are exchanged.

Figure 4A:
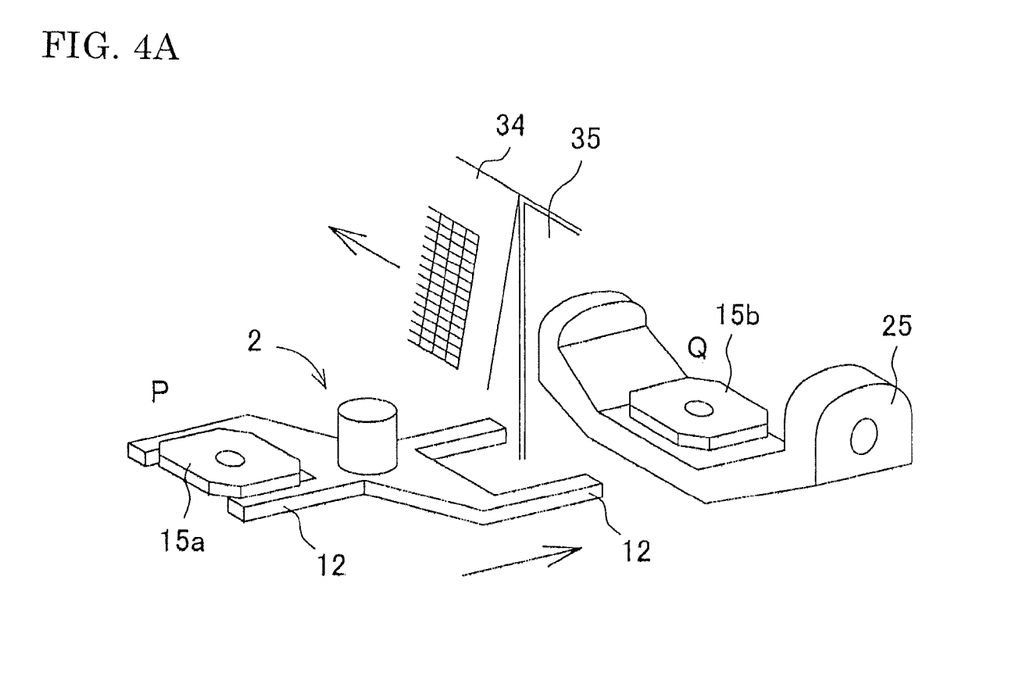
FIGS. 4A-4B are explanatory diagrams illustrating forms that the pre-machining pallet and a post-machining pallet are exchanged.

When the NC device gives a pallet exchanging command, in the working machine main body 21, the table 27 to which the post-machining pallet 15b is fixed is moved from the machining position to the exchanging position Q (FIG. 4A). Concretely, the table 27 is revolved around the A axis and the C axis by the AC axis unit 24 so as to be returned to a home position (an initial position and in a state that the table 27 is horizontal), and the AC axis unit 24 is slid to the Y axis direction so as to be moved to the exchanging position Q. Further, the spindle head 32 is slid to the X axis and Y axis directions so as to be moved to an upper position where the pallet exchange is not disturbed. Then, the door 34 is opened.

Figure 4B:
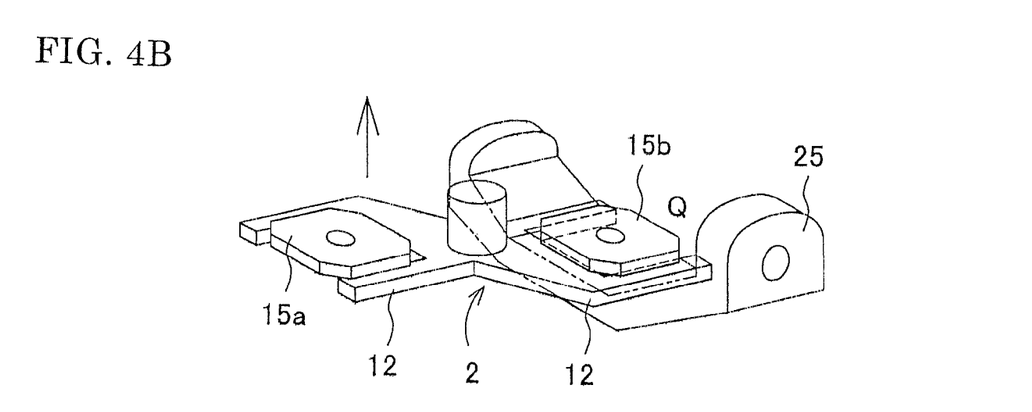

On the other hand, in the pallet exchanging device 1, in a state that the pre-machining pallet 15a which is prepared as mentioned later is supported to one fork 12 in the standby position P, the arm 2 is brought into a posture such that the other fork (the fork which does not support the pre-machining pallet 15a) 12 faces the working machine main body 21 (FIG. 4A). When the door 34 is opened, the arm 2 in the above posture is slid along the Y axis direction towards the working machine main body 21, and is moved into the machining space via the work carry-in port 35 so that the other fork 12 is inserted below the post-machining pallet 15b fixed onto the table 27 in the exchanging position Q (FIG. 4B). After the fixing between the table 27 and the post-machining pallet 15b is released, the arm 2 is moved upward, and the post-machining pallet 15b is supported by the fork 12.

Figure 5C:
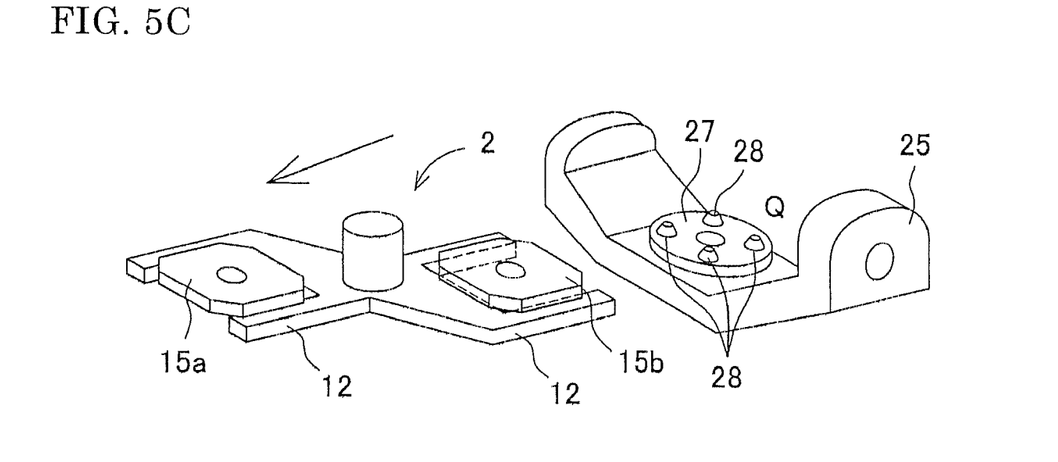
FIGS. 5C-5E are explanatory diagrams illustrating forms that the pre-machining pallet and the post-machining pallet are exchanged.
Figure 5D:
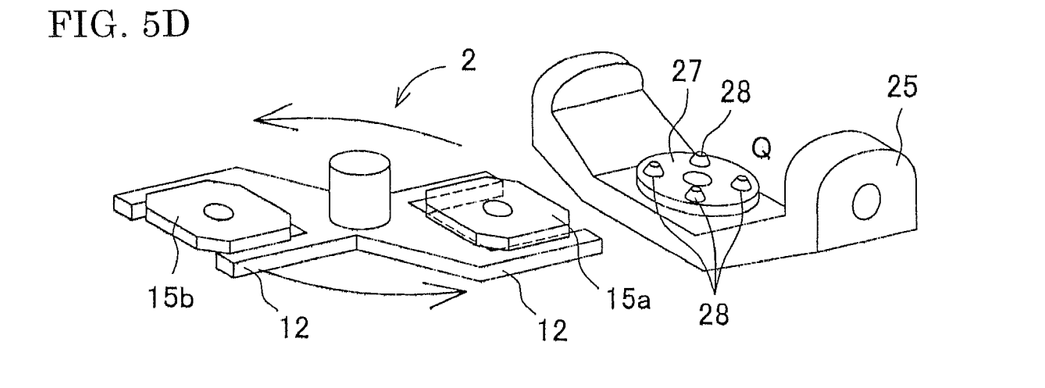
Figure 5E:
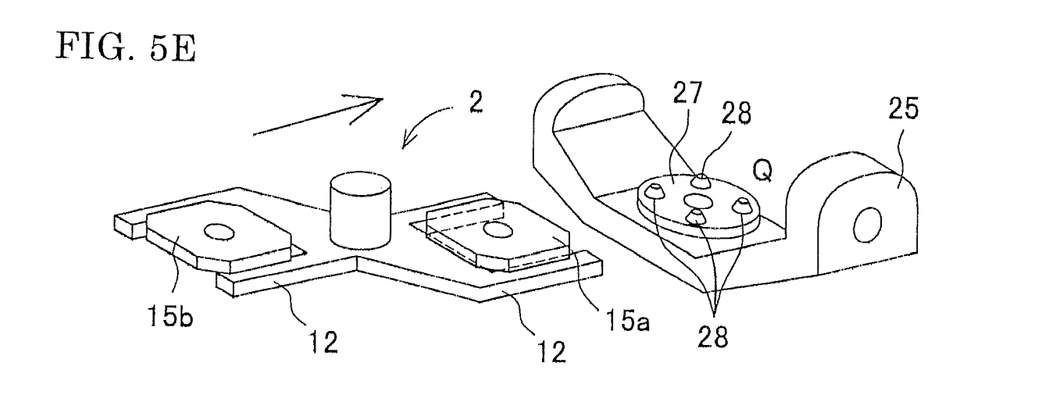

Further, the arm 2 is slid along the Y axis direction to the front (the direction separated from the working machine main body 21) (FIG. 5C), and when the arm 2 is in a revolvable position, the arm 2 is revolved 180° so as to be brought into a posture such that the pre-machining pallet 15a faces the working machine main body 21 (FIG. 5D). The arm 2 is again slid to the working machine main body 21, and the pre-machining pallet 15a is positioned above the table 27 (FIG. 5E).

Figure 6F:
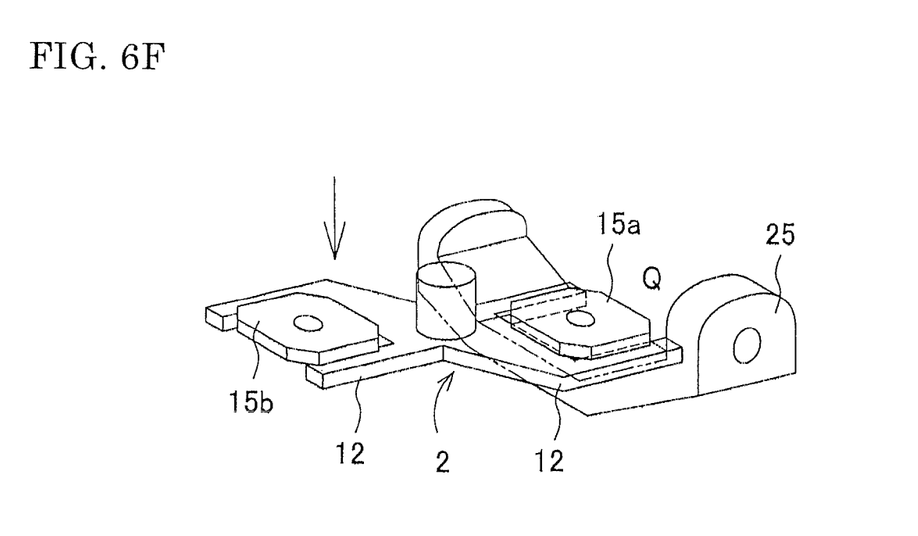
FIGS. 6F-6G are explanatory diagrams illustrating forms that the pre-machining pallet and the post-machining pallet are exchanged.
Figure 6G:
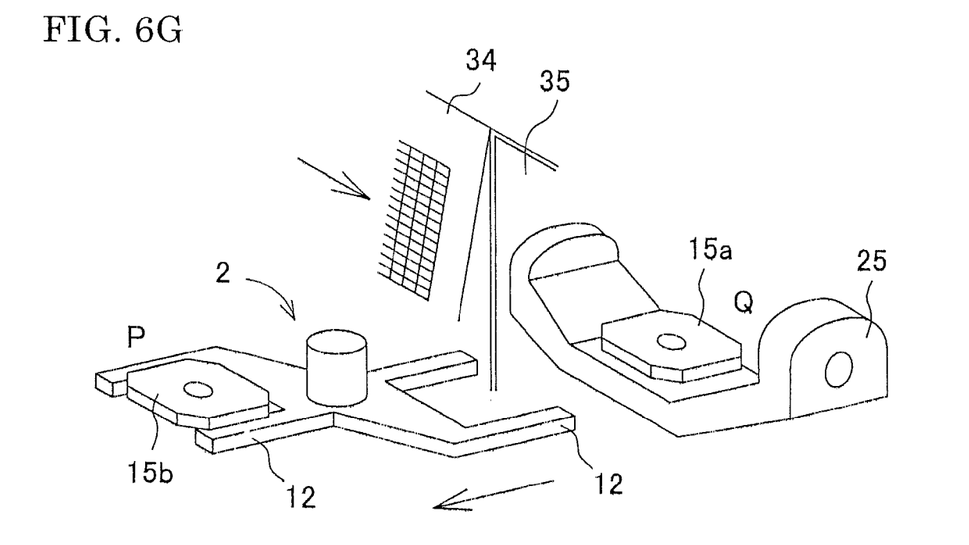

Thereafter, the arm 2 is lowered, and the pre-machining pallet 15a is placed on the table 27 (FIG. 6F). At this time, the pre-machining pallet 15a is located by the taper cones 28, 28 and is fixed firmly to the table 27 by the clamp device. When the installation of the pre-machining pallet 15a is completed, and the arm 2 is slid to the front, so that the forks 12 are drawn out from the pre-machining pallet 15a (FIG. 6G), the door 34 is closed and the work on the pre-machining pallet 15a is machined in the working machine main body 21.

The pallet exchanging device 1 exchanges the pallets between the arm 2 and the working machine main body 21 in the above manner. The position where the pallets are exchanged between the arm 2 and the working machine main body 21 (at the time of exchanging the pallets, the range where the arm 2 slides to the front-rear direction with respect to the working machine main body 21 and this range includes the standby position P) is defined as the first position of the arm 2.

On the other hand, in the pallet exchanging device 1, while the work on the pre-machining pallet 15a is being machined, the arm 2 exchanges the post-machining pallet 15b received from the working machine main body 21 and the pre-machining pallet 15c on which a new work before machining stored in the pallet stocker 3 is placed, so as to prepare the moving of the pallet 15c to the standby position P. The preparation of the moving of the pre-machining pallet 15c to the standby position P is explained below with reference to FIGS. 7A to 9H. FIGS. 7A to 9H are explanatory diagrams illustrating forms that the post-machining pallet 15b and the pre-machining pallet 15c are exchanged.

Figure 7A:
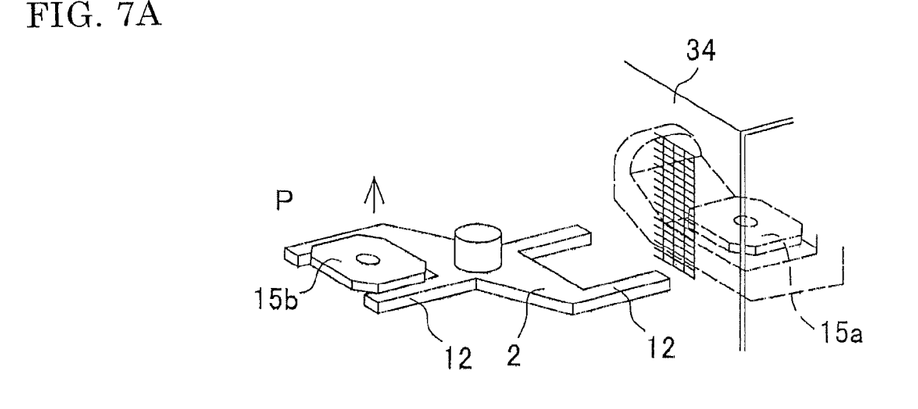
FIGS. 7A-7C are explanatory diagrams illustrating forms that the post-machining pallet and the pre-machining pallet are exchanged.
Figure 7B:
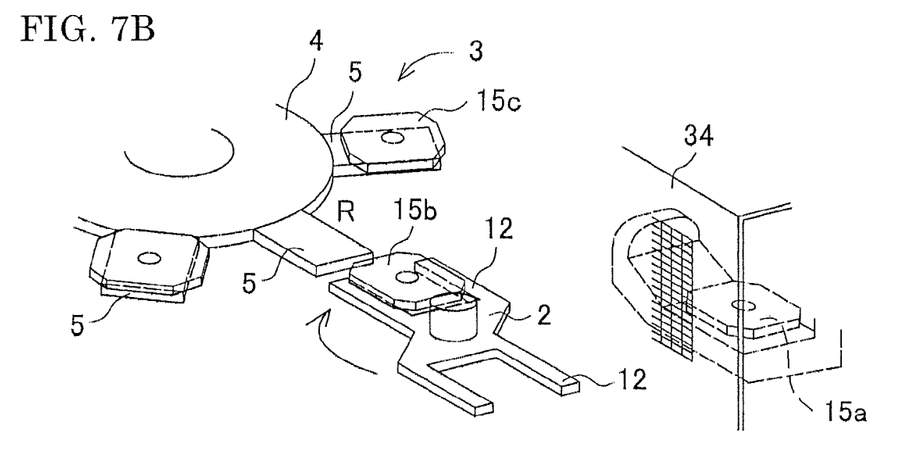

In the state that the post-machining pallet 15b is supported by the forks 12, after the arm 2 is moved upward (FIG. 7A), the arm 2 is revolved 90° until the post-machining pallet 15b faces the pallet stocker 3 (FIG. 7B). At this time, in the pallet stocker 3, the pallet placing pedestal 5 (an empty pedestal on which a pallet is not placed) which can receive the post-machining pallet 15b is revolved and brought to a predetermined delivery position (the position facing the arm 2) R.

Figure 7C:
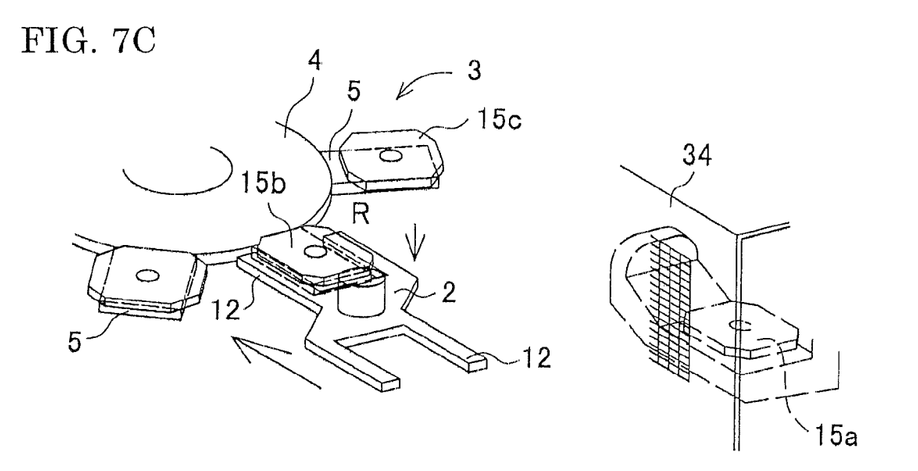
Figure 8D:
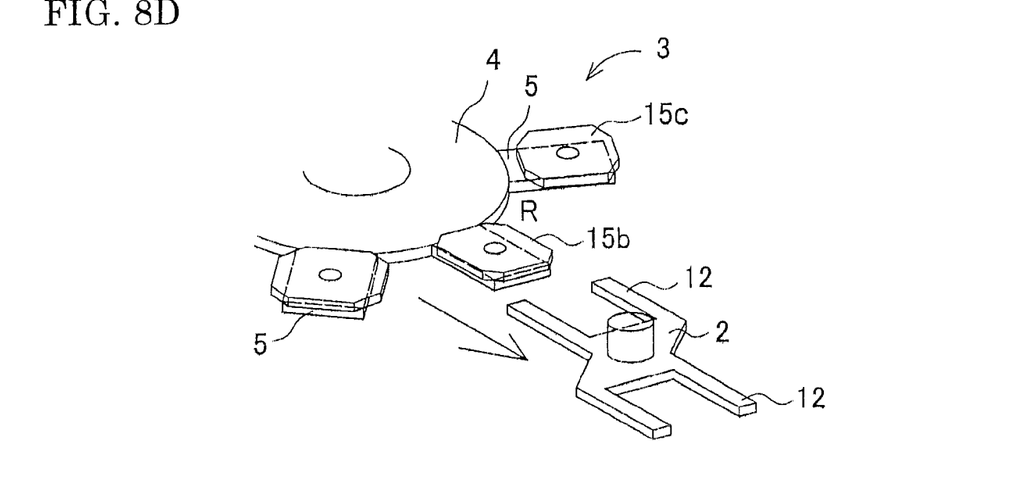
FIGS. 8D-8F are explanatory diagrams illustrating forms that the post-machining pallet and the pre-machining pallet are exchanged.
Figure 8E:
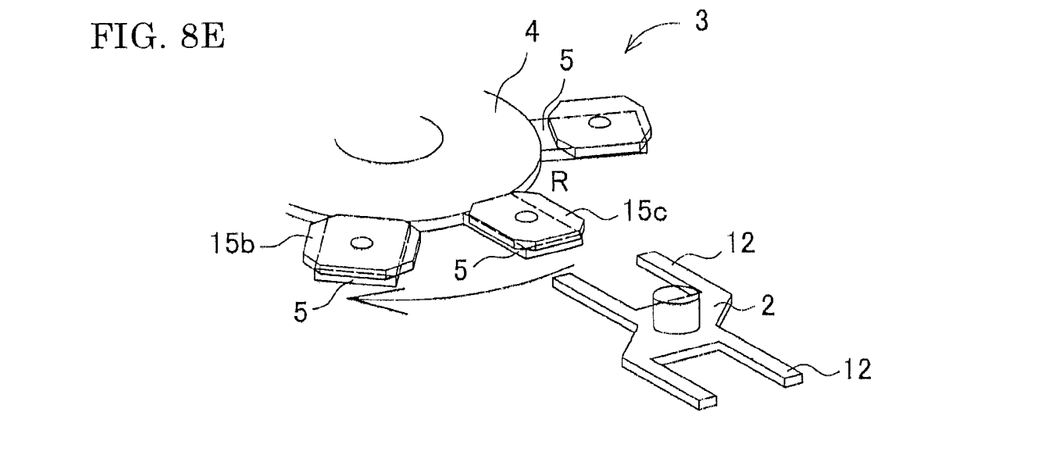

The arm 2 in the above posture is slid along the X axis direction to the pallet stocker 3. When the post-machining pallet 15b is located above the pallet placing pedestal 5 at the delivery position R, the arm 2 is lowered so that the post-machining pallet 15b is delivered to the pallet placing pedestal 5 (FIG. 7C). Then, the arm 2 is slid in a right direction (direction separated from the pallet stocker 3) along the X axis direction to a position allowing the main body 4 of the pallet stocker 3 to revolve (namely, the pallet placing pedestals 5, 5 . . . do not disturb the arm 2) (FIG. 8D). Thereafter, the main body 4 is revolved, and accordingly, the pallet placing pedestal 5 is revolved to be brought to the delivery position R where the pre-machining pallet 15c placed on the pallet pedestal 5 is delivered to the arm 2 (FIG. 8E).

Figure 8F:
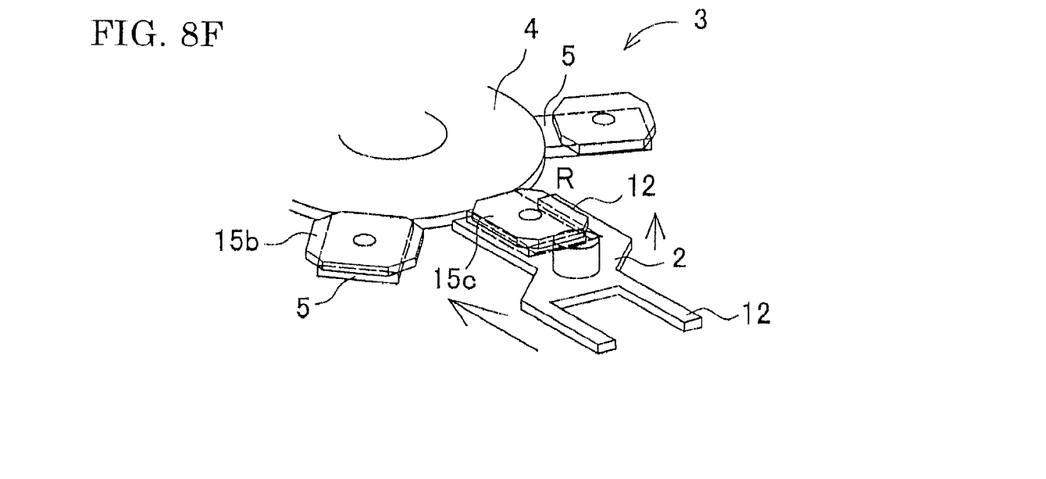
Figure 9G:
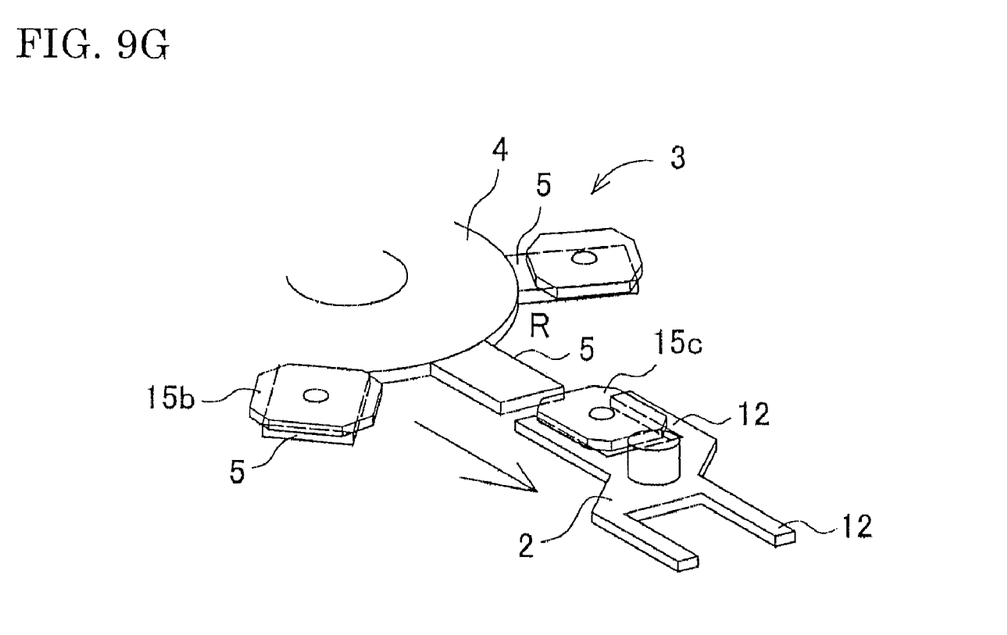
FIGS. 9G-9H are explanatory diagrams illustrating forms that the post-machining pallet and the pre-machining pallet are exchanged.
Figure 9H:
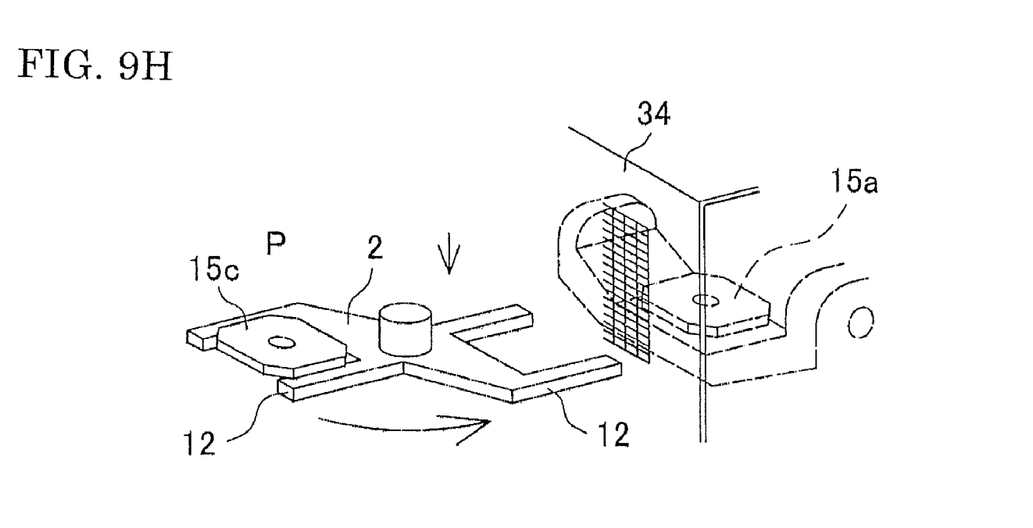

The arm 2 is again slid along the X axis direction to the pallet stocker 3, and after the forks 12 are inserted below the pre-machining pallet 15c on the pallet placing pedestal 5 in the delivery position R, the arm 2 is moved upward so as to receive the pre-machining pallet 15c from the pallet stocker 3 (FIG. 8F). Thereafter, the arm 2 is slid to the right direction (FIG. 9G) and is lowered, and is revolved left 90° (FIG. 9H) until the pre-machining pallet 15c is sent to the standby position P (the posture such that the fork 12 which does not support the pre-machining pallet 15c faces the working machine main body 21). The arms 2 in this posture stands by until the NC control device gives a new pallet exchange command. The setup of works on the pallets in the pallet stocker 3 is carried out while the arm 2 stands by.

The pallet exchanging device 1 prepares to send the pre-machining pallet 15c to the standby position P in the above manner. The position where the arm 2 delivers pallets in the delivery position R of the pallet stocker 3 (the range where the arm 2 slides in the right-left direction with respect to the pallet stocker 3 while the arm 2 delivers the post-machining pallet 15b to the pallet placing pedestal 5 in the delivery position R and receives the pre-machining pallet 15c on the pallet placing pedestal 5 newly revolved to be brought to the pallet delivery position R at the time of delivery of the pallets, and this range does not include the standby position P) is determined as the second position of the arm 2.

Figure 10:
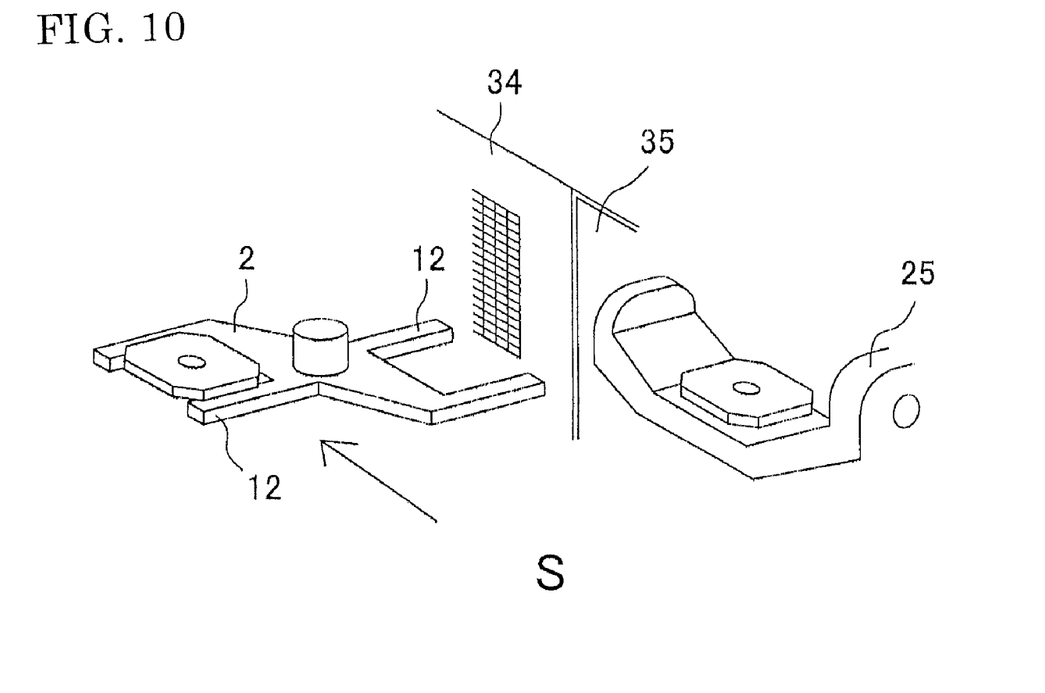
FIG. 10 is an explanatory diagram illustrating a form that a working space is secured.

In the case where a worker performs the maintenance operation, as shown in FIG. 10, the arm 2 is slid along the X axis direction to the left direction (to the pallet stocker 3, namely, the second position) and is sent to a rest position, so that a working space S can be secured on the front side of the work carry-in port 35 of the working machine main body 21. In the case where the working space S is secured, it is desirable that the arm 2 is slid to the left direction in the posture such that the forks 12 face the front and rear directions of the working machine 20.

According to the pallet exchanging device 1, the arm 2 can be slid not only to the front-rear direction (Y axis direction) but also to the right-left direction (X axis direction) with respect to the working machine main body 21, and the arm 2 can be moved between the first position and the second position. Thus, in the case where the worker desires to access to the front side of the working machine main body 21 so as to perform the maintenance operation, the arm 2 is slid along the X axis direction to the second position, namely, to the pallet stocker 3, thereby securing the working space S on the front side of the work carry-in port 35 of the working machine main body 21. Therefore, when this device is compared with the device proposed by the same applicant of the invention, the sufficient working space can be surely secured on the front side of the working machine main body for the worker, which is convenient.

In addition, the pallet exchanging device 1 adopts a multi-phase pallet exchange system where the pallet stocker 3 for storing a plurality of pallets is provided to the left side of the arm 2, and the pallets can be delivered between the arm 2 and the pallet stocker 3, by sliding, revolving, and lifting/lowering the arm 2 at the second position. Thus, the efficient machining can be carried out.

The pallet stocker 3 includes the plural pallet placing pedestals 5, 5 . . . which protrudes from the main body 4 to the radial direction, and the main body 4 is revolved around the axis parallel with the Z axis direction. As a result, the desired pallet placing pedestal 5 can be revolved to be brought to the delivery position R. That is to say, different from the conventional systems, the pallet stocker 3 can be operated, so that the sliding distance of the arm 2 can be shortened, thereby downsizing the apparatus itself and shortening the time required for the exchange.

In addition, since the stored pallet in the pallet stocker 3 can be brought to the setup station 8 by the revolving operation, the efficiency of the setup work can be improved greatly in comparison with the conventional devices which do not perform such an operation. The setup work may be carried out while the arm 2 stands by, and thus the working machine 20 which is radial and has excellent machining efficiency can be provided.

The constitution of the pallet exchanging device of the present invention is not limited to the form described in the above embodiment, and thus the constitutions of the pallet supporting unit and the pallet storage device can be suitably changed without departing from the purpose of the present invention as the need arises.

For example, the above embodiment adopts the arm having the paired forks facing opposite directions as the pallet supporting unit in the pallet exchanging device, but can adopt a pallet supporting unit having three or more forks. Even in the case of a pallet supporting unit having a pair of forks, the pallet supporting unit may have well known forks which are not shifted around the axis to the right-left direction (for example, the linear arm disclosed in the Japanese Utility Model Laid-Open No. 6-63252) differently from the above embodiment.

At the time of the pallet exchange between the working machine main body and the pallet supporting unit, the pallet supporting unit is not slid to the front-rear direction, but the pallet supporting unit may be extended and retracted with respect to the working machine main body so that pallets are exchanged. Further, the installing position of the pallet storage device can be suitably changed and thus it is not limited to the left side of the pallet supporting unit, and can be provided to the right side, or diagonally backward right or left position.

As the pallet storage device, in this embodiment, the pallet stocker which has six pallet placing pedestals protruded to the radial direction is adopted, but the number and the shape of the pallet placing pedestals can be suitably changed in such a manner that more pallets are circulated by using a chain. A pallet storage device which has a plurality of pallet placing pedestals provided to upper and lower tiers may be adopted.

In addition, the pallet exchanging device of the present invention can be obviously applied to working machines other than the 5-axis control vertical machining center described in the above embodiment (for example, the working machines such as normal vertical machining centers and horizontal machining centers in which a work is placed on a table). In such working machines, the work carry-in/out port may be provided not to the front side of the working machine but on the side of the table.

What is claimed is:

1. A pallet exchanging device for exchanging pallets in a machine tool main body via a work carry-in port through which a work is carried into a machining space of the main body along a first lateral direction in a horizontal plane of the main body, said device comprising:

a pallet supporting unit for supporting at least two pallets at horizontally-spaced locations, each pallet being where a respective work is placed, the pallet supporting unit configured to rotate the pallets at the horizontally-spaced locations about a common vertical axis;

a base platen having said pallet supporting unit thereon and being movable in said first lateral direction and also being positioned so as to move in a second lateral direction, perpendicular to said first lateral direction, in the horizontal plane of the main body; and a pallet storage device having a plurality of pallet holders for holding pallets, wherein the pallet storage device is provided so as to be offset from the work carry-in port of the main body along said second lateral direction, and in the pallet storage device any pallet holder can be brought to a delivery position where a pallet is delivered and received to/from the pallet supporting unit, wherein the pallet supporting unit is movable in said first lateral direction and is also movable in said second lateral direction, by virtue of being carried by said base platen, between a first position where the pallets are exchanged in the main body and a second position where the pallet is delivered and received at the delivery position of the pallet storage device, and the pallet supporting unit is positioned at a standby position on the side of the second position by movement of said base platen in said second lateral direction, and wherein a working space is provided directly opposed to the work carry-in port when the pallet supporting unit is positioned at the standby position.

2. The pallet exchanging device according to claim 1, wherein the pallet storage device is constituted so that the pallet holders are protruded from a main body to a radial direction and the main body is revolved around a vertical axis so that any pallet holder is brought to the delivery position.

* * * * *